April 11, 1950 — N. MARUSOV — 2,503,676
VISCOMETER
Filed Oct. 11, 1948 — 2 Sheets-Sheet 1
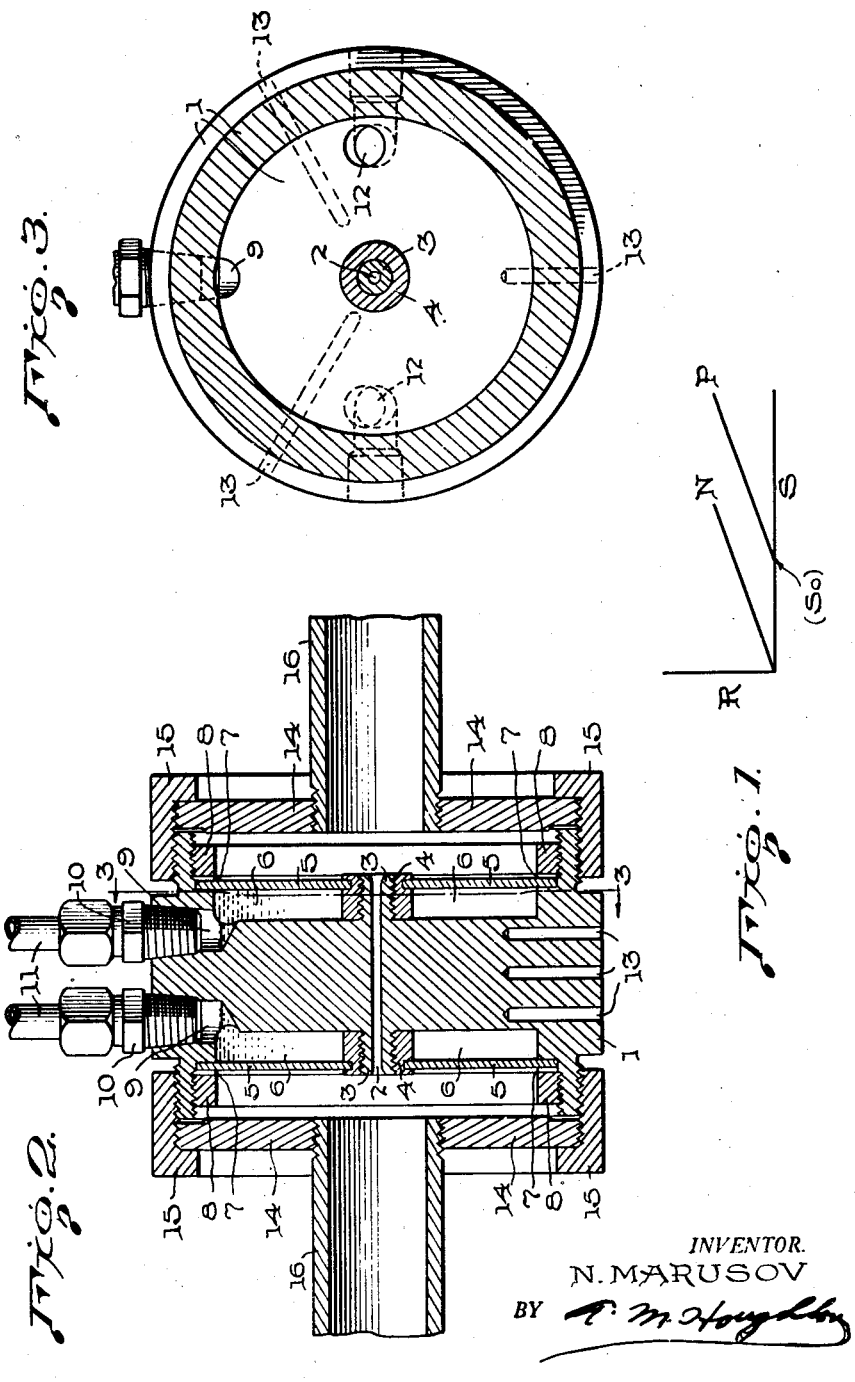
INVENTOR.
N. MARUSOV
BY
ATTORNEY Patented Apr. 11, 1950

2,503,676

UNITED STATES PATENT OFFICE 2,503,676

VISCOMETER

Nicholas Marusov, Penn Township, Allegheny County, Pa., assignor to Gulf Research & Development Company, Pittsburgh, Pa., a corporation of Delaware Application October 11, 1948, Serial No. 53,805

7 Claims. (Cl. 73—55)

This invention relates to a device for studying and measuring the rheological properties of plastic substances, and more particularly, to improvements in viscometers for determining the flow characteristics of such materials as greases, drilling muds, paints, gums, bitumens and the like.

The viscosities of most plastic materials will change when such materials are subjected to working. For example, it is well known that putty, grease and bread dough become more pliable after they have been kneaded, or more specifically, after they have been worked for a period of time. Many of these plastics become more rigid again if they are permitted to stand after they have been worked. This characteristic of change in viscosity or consistency with working and the resetting of such materials after working is called thixotropy. The common grease viscometers known in the art do not, generally speaking, take into consideration the thixotropic nature of plastic substances. In other words, they do not subject the materials under observation to various amounts of work so that viscosity determinations may be made after the material has been subjected to controlled periods of working. Consequently, common viscometers do not give an accurate picture of how a plastic material such as a grease may act in various applications thereof.

The viscosity of a grease identifies its flow behavior as well as its behavior when used in the operation of bearings. However, the viscosity of a grease changes with temperature, rate of shear, amount of work to which it is subjected, the rate at which the work is done, and for some greases, the time lapse since working. A knowledge of the degree and rate of change of the state of such plastics, due to the above factors, is necessary before an accurate prediction of the behavior of a grease can be made in a particular application and under actual operating conditions. Accordingly, these factors should also be considered when making up schedules of specifications for various greases. It is apparent that common viscometers do not supply such information, and further, do not permit the making of continuous studies of a grease at various rates and degrees of work to which the grease may be subjected.

A viscometer meeting this need is described in U. S. patent application of Exline and Aikins Serial No. 52,984, filed Oct. 6, 1948. Briefly stated, they have provided a viscometer of the capillary type comprising a capillary tube, means for alternately passing the material under observation in different directions through said capillary tube, pressure determining means connecting with the ends of said capillary tube, means for determining the rate of flow through said capillary tube, and means for maintaining said capillary tube and the material under observation at a substantially constant temperature. To determine the pressure differential across the capillary tube, pressure lines connecting with the lines feeding the capillary tube conduct portions of the material under observation to one or a pair of pressure gauges. Thus, the plastic material under observation acts as the pressure transmitting medium, which tends to introduce pressure errors in the readings obtained from the viscometer. These errors are largely due to the fact that the pressure transmitting medium is a plastic material, or non-Newtonian in nature.

The behavior of both Newtonian and plastic materials may be determined from the fundamental equation, $$F = \frac{V\mu A}{h} \quad (1)$$

wherein (F) is the force required to slide a plate of area (A), at a velocity (V) over another plate which is separated therefrom by a material having a viscosity ($\mu$) and a film thickness ($h$). By rearranging Equation 1, we have Newton's mathematical definition of viscosity, $$\mu = \frac{F/A}{V/h} = \frac{\text{Shearing stress}}{\text{Rate of Shear}} = \frac{S}{R} \quad (2)$$

when a plot of shearing stress (S) against rate of shear (R) is a straight line and passes through the origin as shown in Figure 1, line N, the material is classified as a Newtonian liquid of which water, oil, alcohol, and the like are examples. When the curve intercepts the stress axis, as line P of Figure 1 does, the material is classed as a plastic solid whether the line is straight or not. For such a material, flow or movement begins only after the yield shear stress ($S_0$) has been reached. Greases, paints, muds, putty, bread dough and the like are examples of plastic solids.

If a pressure is to be measured at some specific point and a plastic material used as the pressure transmitting medium in a line connecting that point with a pressure gauge at some remote point, erroneous results will be obtained due to the yield value of the pressure transmitting medium. The yield value has the same dimensions as the shear stress and can be determined from the following equation:

$$S_0 = \frac{1}{2} \frac{Pr}{L} \quad (3)$$

wherein $S_0$ = yield shear stress
$r$ = radius of the hydraulic line
$L$ = length of the hydraulic line
$P$ = pressure difference between the extremities of the hydraulic line.

Thus, any pressure readings so obtained would be in error by the amount shown in the equation, $$P = \frac{2S_0 L}{r} \quad (4)$$

Accordingly, the primary object of my invention is the provision of an improved viscometer which will eliminate such errors in pressure measurement for all practical purposes. More specifically, it is an object of my invention to provide a viscometer which will furnish information with greater accuracy than has heretofore been possible concerning the flow characteristics of plastic materials after they have been subjected to various degrees and rates of work. A further object of my invention is the provision of a device of the character described which will furnish information from which the amount of work done and the rate of doing work on the material under observation may be calculated. Another object of my invention is the provision of a viscometer which will furnish information from which the apparent and absolute viscosities of the material under observation may be calculated. A still further object of my invention is the provision of a viscometer which will permit continuous studies to be made on an initial sample of material under a variety of test conditions. Another object is the provision of a viscometer which will permit testing of materials at high static pressures. Other objects appear hereinafter.

These and other objects are accomplished by my invention wherein I provide in a device of the capillary type for determining the flow characteristics of plastic materials and having means for alternately passing the material under observation in different directions through a capillary, the improvement comprising a capillary tube, means connecting the material under observation with the ends of said capillary tube, a well contiguous to each end of said capillary tube for receiving a Newtonian liquid, a flexible pressure responsive means constituting a wall of each well separating said Newtonian liquid from the material under observation, and pressure determining means connecting with said wells. I have found that such use of a Newtonian liquid as a pressure transmitting medium eliminates pressure errors due to the yield value because Newtonian liquids have no yield value. Movement or flow of the Newtonian liquid begins immediately on the application of even the smallest pressure.

My invention is exemplified by the accompanying drawings and the descriptive matter relating thereto. Referring to the drawings, Figure 1 graphically illustrates the difference between Newtonian and plastic materials by means of rate of shear-shearing stress plots, referred to hereinabove;

Figure 2 is an elevation view in section showing an improved capillary and the elements relating thereto;

Figure 3 is a section taken along line 3—3 of Figure 2;

Figure 4:
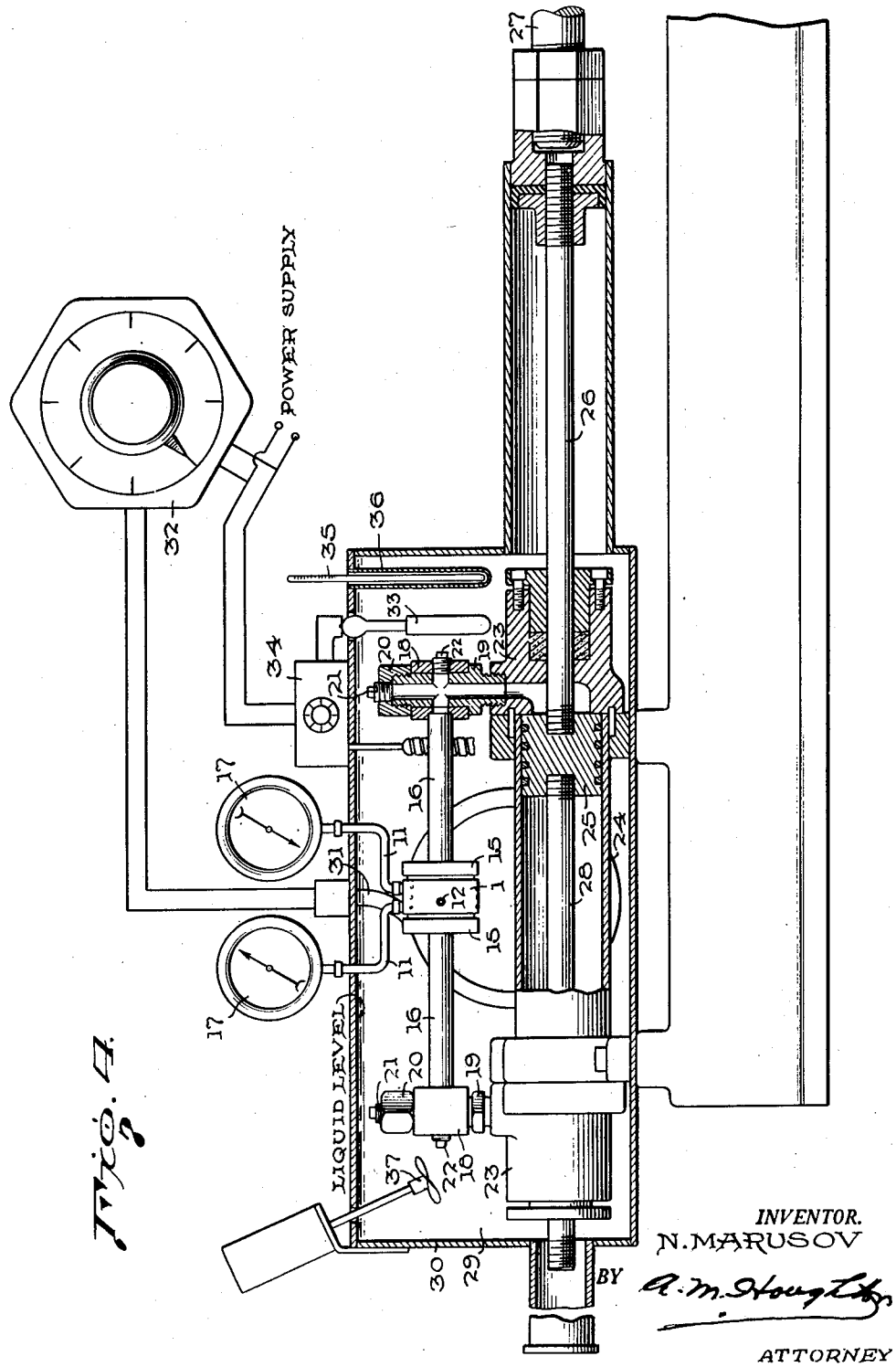
Figure 4 is an elevation view partly in section illustrating the principal elements of a viscometer embodying the improved capillary of Figures 2 and 3.

Referring to Figure 2, the heart of the viscometer is a housing containing a central partition 1 provided with a capillary tube or passage 2 through the central portion thereof. The material under observation is alternately passed in different directions through this capillary tube. Partition 1 is provided with threaded bosses 3 to which are coupled diaphragm retainers 4. These diaphragm retainers 4 aid in retaining diaphragms 5 to form wells 6 between each diaphragm and central partition 1 for the purpose of receiving a Newtonian liquid. Diaphragms 5 are further retained by means of gaskets 7 and rings 8, attached by means of threads to partition 1. Diaphragms 5 should be of such a character that they deform with slight pressures, and resist deterioration when contacted with oils and greases or when subjected to high temperatures. There are many materials which will satisfy these requirements, such as various commercially available synthetic rubbers, as exemplified by the silicone type rubbers. Partition 1 is provided with passages 9 fitted with couplings 10 which connect lines 11, running to pressure gauges, with the wells 6 containing Newtonian liquid, so that pressures at the openings of capillary 2 may be determined at all times. Partition 1 is also provided with passages 12 shown in Figure 3 for the purpose of introducing the Newtonian liquid into wells 6 from reservoirs not shown. A series of thermocouple wells 13 are disposed at various depths in partition 1 to permit extrapolations which will show the temperature at the capillary wall at various locations along the capillary. Facing plates 14 are fitted to the ends of partition 1 by means of couplings 15 and are sufficiently spaced from diaphragms 5 to permit the free circulation of material under observation over the outer diaphragm surfaces. The facing plates 14 and couplings 15 combined with partition 1 form a housing for the capillary. The material under observation is introduced to the capillary by means of lines 16 connected to facing plates 14.

Figure 4 shows the above described capillary unit embodied in a viscometer constructed in other respects as described in the aforesaid Exline and Aikins application. Pressure transmission lines 11 containing the Newtonian liquid pressure transmitting medium are connected with pressure determining means shown as pressure gauges 17 so that the pressure differential across capillary 2 may be determined at all times. However, other pressure determining means, such as a differential pressure gauge connected to both lines 11, may advantageously be used. The ends of the lines 16, diametrically opposite the capillary housing, are fitted into collars 18 mounted on T-joints 19. The upper passages of T-joints 19 are provided with caps 20 and these caps are tapped to accommodate plugs 21 so that the plugs may be removed and pressuring devices attached to permit studies to be made at high static pressures when desired. Collars 18 are also tapped to accommodate plugs 22 which may be removed to introduce the material to be tested into the viscometer. The lower portions of joints 19 are joined to cylinder housings 23 which are adapted to support a cylinder 24 therebetween. Cylinder 24 is provided with a reciprocable piston 25, the purpose of which is to force the material under invention may be made and many equivalents of the elements shown herein may be substituted without departing from the spirit of the invention. For example, other pressure responsive means may be substituted for diaphragms 5, such as pair of bellows of the Sylphon type or the like. Also, this invention is not to be limited to the particular type of engine disclosed herein for reciprocating piston 25, as many other engines known to the art would be suitable. Furthermore, the means employed for the timing of the stroke of piston 25 is included herein merely to illustrate a method which may advantageously be used and should not be considered as a limiting feature. Other means for determining flow rate may be used without departing from my invention. For instance, a flow gauge may be installed in the system directly in the path of the material being passed through the capillary tube.

One of the most important advantages of my invention is that it makes possible the measurement of pressures at the ends of a capillary with a greater degree of accuracy than has heretofore been possible in a viscometer such as that described hereinabove. This is due to the use of a Newtonian liquid as a pressure transmitting medium in preference to the plastic material under observation. Another important advantage results from the measuring of these pressures very close to the capillary openings by means of the construction described hereinabove facilitating pressure measurements which are truly representative of those pressures existing at the ends of the capillary. Another advantage of my invention is that it provides a viscometer which is capable of making viscosity determinations of a thixotropic material after it has been worked for a period of time. Still another advantage is that both the amount of work done and the rate of doing work may be varied so that a more accurate indication of what the material under test may do under actual operating conditions can be obtained. This is partly due to the fact that continuous studies are made possible by my viscometer as opposed to the many viscometers wherein only one set of determinations may be obtained from a single sample.

The preferred embodiments specifically described herein are intended to be merely illustrative of my invention and in no manner should they be considered as limitations thereof or as limiting the scope of the appended claims hereinafter made.

What I claim is:

1. In a device of the capillary type for determining the flow characteristics of a plastic material and having means for alternately passing the material under observation in different directions through a capillary, the combination therewith of a capillary tube, means connecting the material under observation with the ends of said capillary tube, a well contiguous to each end of said capillary tube for receiving a Newtonian liquid, a flexible pressure responsive means constituting a wall of each well separating said Newtonian liquid from the material under observation, and pressure determining means connecting with said wells.

2. In a device of the capillary type for determining the flow characteristics of a plastic material and having means for alternately passing the material under observation in different directions through a capillary, the combination therewith of a capillary tube, a pair of pressure responsive diaphragms each located contiguous to an end of said capillary tube, means between said diaphragms defining separate wells enclosed by said diaphragms and containing a Newtonian liquid, means connecting the material under observation with the ends of said capillary tube and with said diaphragms, and pressure determining means connecting with said wells.

3. In a device of the capillary type for determining the flow characteristics of a plastic material and having means for alternately passing the material under observation in different directions through a capillary, the combination therewith of a capillary housing having a capillary tube therein, wells in said capillary housing to receive a Newtonian liquid, means connecting the material under observation with said capillary tube, pressure responsive diaphragm means contiguous to the openings of said capillary tube separating said Newtonian liquid from the material under observation, and pressure determining means connecting with said wells.

4. In a device of the capillary type for determining the flow characteristics of a plastic material and having means for alternately passing the material under observation in different directions through a capillary, the combination therewith of a partition having a capillary passage therethrough, said partition being provided with annular recessed portions disposed about each capillary opening to receive a Newtonian liquid, pressure responsive diaphragms sealing said annular recessed portions to retain said Newtonian liquid, means connecting the material under observation with said capillary opening and said diaphragms, and pressure determining means connecting with said annular recessed portions in said partition.

5. In a device of the capillary type for determining the flow characteristics of a plastic material and having means for alternately passing the material under observation in different directions through a capillary, the combination therewith of a partition having a capillary passage therethrough, said partition being provided with annular recessed portions contiguous to each capillary opening to receive a Newtonian liquid and passages for introducing said Newtonian liquid and passages connecting said annular recessed portions with pressure determining means, pressure responsive diaphragms sealing said annular recessed portions to retain said Newtonian liquid, and means connecting the material under observation with said capillary openings and said diaphragms.

6. In a device of the capillary type for determining the flow characteristics of a plastic material and having means for alternately passing the material under observation in different directions through a capillary, the combination therewith of a partition having a capillary passage therethrough, said partition being provided with annular recessed portions contiguous to each capillary opening to receive a Newtonian liquid and passages for introducing said Newtonian liquid and passages connecting said annular recessed portions with pressure determining means and thermocouple wells disposed along said capillary, pressure responsive diaphragms sealing said annular recessed portions to retain said Newtonian liquid, and means connecting the material under observation with said capillary openings and said diaphragms.

7. In a grease viscometer of the capillary type having means for alternately passing the grease under test in different directions through a capilobservation through capillary tube 2. It can be seen that a free passage exists from the capillary tube 2 to both sides of piston 25, so that as piston 25 is reciprocated the material being tested will alternately be forced through capillary tube 2. Piston 25 derives its motivation from a hydraulic engine (not shown) and is connected thereto by means of piston rod 26 and connecting rod 27. The side of piston 25 opposite piston rod 26 is provided with another rod 28, which may be an extension of piston rod 26, to equalize the volumetric displacement on both sides of piston 25 as it is reciprocated. Temperature control of the viscometer is provided by means of a constant temperature bath 29 contained in a housing 30 surrounding all the viscometer elements containing the material under observation. Heat for this thermobath is supplied through main electrical heater 31 which is controlled by a variable autotransformer 32. To facilitate a finer degree of heat control, main heater 31 is adjusted to produce slightly less than the amount of heat lost from the system, and an auxiliary heater 33 controlled by a temperature controller 34, is provided to supplement the heat requirements of the system. The temperature of the system may be observed by reading a conveniently placed thermometer 35 situated in a thermometer well 36 depending from the top of housing 30. An electrically operated stirrer 37 is provided to improve the temperature distribution within the thermobath 29.

To determine the rate of flow of the material under observation through capillary tube 2, means to time the stroke of piston 25 are provided. Thus, knowing the volumetric displacement of piston 25 and the time of the stroke, it is possible to compute the rate of flow through capillary tube 2.

The operation of the viscometer simply consists in introducing the material to be tested into the system and starting the hydraulic engine reciprocate piston 25. Temperature controls may be varied as desired and the speed of reciprocation of piston 25 may also be varied at will by minor adjustments in the hydraulic system. The remaining test procedure then consists in reading from pressure gauges 17 the pressure differential across capillary tube 2 and observing the time of each piston stroke.

It is then possible to compute from known information and that information which is observed during testing operations the apparent and absolute viscosities of the material within the viscometer. Poiseuille is credited with the mathematical development which led to an equation which would permit measuring viscosity of a Newtonian liquid by means of capillary tubes. One form of this equation is as follows:

$$\mu = \frac{\pi P r^4}{8L\frac{V}{t}} = \frac{Pr/2L}{4\frac{V}{t}/\pi r^3} = \frac{\text{Shearing Stress}}{\text{Rate of Shear}} \quad (5)$$

wherein $\mu$=Viscosity.
P=Pressure differential across the capillary tube.
r=Radius of the capillary tube.
L=Length of the capillary tube.
V=Volume of fluid flowing through the capillary tube.
t=Time in which V quantity of fluid flows through the capillary tube.

Strictly speaking, Equation 5 applies only to Newtonian liquids. However, many investigators of non-Newtonian substances applied the results obtained with capillary type viscometers to Poiseuille's equation and then called the results "apparent viscosity." Weissenberg and Robinowitsch developed a formula for transforming flow-pressure data to show the rate of shear as a function of the shearing stress, regardless of whether or not the material is Newtonian. This formula is as follows:

$$R = f(S) = \frac{1}{\pi r^3}\left[\left(\frac{1}{2}\frac{rP}{L}\right)\left(\frac{dQ}{dS_1}\right) + 3Q\right] \quad (6)$$

wherein

R=Rate of shear.
r=Radius of capillary tube.
L=Length of capillary tube.
P=Pressure differential across the capillary tube.
Q=Flow rate.
$S_1$=Shearing stress at the capillary walls.

The equation for shearing stress at the capillary walls is as follows:

$$S_1 = \frac{1}{2}\frac{rP}{L} \quad (7)$$

wherein $r$, P and L are as designated hereinabove. Using the value of R obtained from Equation 6 and the value of $S_1$ obtained from Equation 7, the absolute viscosity may be obtained merely by dividing the shearing stress by the rate of shear in accordance with Newton's fundamental definition of viscosity:

$$\mu = \frac{S}{R} \quad (8)$$

The above viscosity information can be obtained at any time since continuous studies of a sample are made possible by the use of my viscometer. The material under test can be worked any amount before viscosity results are recorded. The material under test may then be worked even more and another group of viscosity results may be recorded. At the end of any working schedule, viscosity data may be recorded, a rest period permitted, and another set of viscosity data may be obtained. These working schedules may include various rates at which the work has been done, and both the rate of doing work and the amount of work done may be determined and expressed in fundamental units. These results are obtained from the flow-pressure data as shown in the following equations:

$$\text{Work rate} = \frac{dW}{dt} = P \times \frac{V}{t} \quad (9)$$

wherein

P=Pressure differential across the capillary tube.
$\frac{V}{t}$=Flow rate through the capillary tube.

The flow rate may be obtained simply by dividing the volumetric displacement of piston 25, which is fixed and easily obtainable, by the time required for each stroke. Total work done merely requires a multiplication of the work rate by the time involved:

$$\text{Total work} = W = \frac{dW}{dt} \times t \quad (10)$$

If the work rate changes, as it usually will due to the thixotropic nature of the material under observation, the total work may be obtained by making a diagram of work rate plotted as a function of time and then integrating the area under the curve.

It is apparent that many modifications of my lary, the combination therewith of a partition having a capillary passage therethrough, said partition being provided with annular recessed portions contiguous to each capillary opening to receive a Newtonian liquid and passages for introducing said Newtonian liquid and passages connecting said annular recessed portions with pressure determining means and thermocouple wells disposed along said capillary, pressure responsive diaphragms sealing said annular recessed portions to retain said Newtonian liquid, and couplings connecting the grease under test with said capillary openings and disposed to permit the grease to contact the outer surfaces of said diaphragms.

NICHOLAS MARUSOV.

REFERENCES CITED

The following references are of record in the file of this patent:

FOREIGN PATENTS

| Number | Country | Date |
| --- | --- | --- |
| 241,652 | Great Britain | Oct. 29, 1925 |
| 253,266 | Great Britain | June 17, 1926 |